United States Patent [19]

Windley

[11] Patent Number: 5,155,178

[45] Date of Patent: Oct. 13, 1992

[54] ANTISTAIN BLOCK COPOLYMER COMPOSITIONS OF MODIFIED NYLON COPOLYMERS AND HIGH CARBON NYLONS

[75] Inventor: William T. Windley, Seaford, Del.

[73] Assignee: E. I. Du Pont de Nemours and Company, Wilmington, Del.

[21] Appl. No.: 564,686

[22] Filed: Aug. 8, 1990

[51] Int. Cl.$^5$ .............................................. C08L 77/00
[52] U.S. Cl. .................................... 525/432; 525/420; 428/97; 8/115.6
[58] Field of Search .......................................... 525/432

[56] References Cited

U.S. PATENT DOCUMENTS

| | | | |
|---|---|---|---|
| 3,039,990 | 6/1962 | Huffman | 260/42 |
| 3,142,662 | 7/1964 | Huffman | 260/78 |
| 3,389,549 | 6/1968 | David | 57/140 |
| 3,440,226 | 4/1969 | Crovatt et al. | 260/78 |
| 3,542,743 | 11/1970 | Flamand | 260/78 |
| 3,640,942 | 2/1972 | Crampsey | 260/37 N |
| 3,755,255 | 8/1973 | Lodge | 260/49 |
| 3,846,507 | 11/1974 | Thomm et al. | 260/857 |
| 4,459,762 | 4/1986 | Ucci | 428/95 |

FOREIGN PATENT DOCUMENTS 0373655  2/1990  European Pat. Off.
1-223908  9/1989  Japan.

*Primary Examiner*—Ana L. Carrillo

[57] ABSTRACT

Blends of nylon 6,6, nylon 6 or nylon 6,6/6 copolymer which contain a randomly copolymerized cationic dye modifier are formed by melt blending such copolymer with a polyamide having 8 to 22 carbon atoms per amide link to form a block copolymer composition which is resistant to staining with acid dyes under ambient temperature and pH conditions.

10 Claims, No Drawings

ANTISTAIN BLOCK COPOLYMER COMPOSITIONS OF MODIFIED NYLON COPOLYMERS AND HIGH CARBON NYLONS

BACKGROUND OF THE INVENTION

1. Field of the Invention

The present invention relates to fiber-forming polyamide compositions useful in the manufacture of stain-resistant textile substrates. More specifically, the polyamide compositions comprise modified nylon 6,6, nylon 6, or nylon 6,6/6 copolymers prepared by salt-blending the precursor salt of such polymers with a cationic dye modifier followed by copolymerization and subsequent melt-blending of the resulting copolymer with about 1–15%, based on final polymer weight, of a polyamide formed from reactants having from 8 to 22 carbon atoms per amide link. The polymer compositions of the current invention are particularly useful in the manufacture of dyed or undyed woven, knitted, or tufted textile materials, and molded nylon or composite products.

2. Prior Art

Polyamide textile materials which resist dyeing by acid dyestuffs are well-known in the art. Polyamide substrates have been rendered stain-resistant by treatment with a dye-resist agent, also referred to herein and in the prior art as a stain-resist agent, such as a sulfonated phenol- or sulfonated naphtol-formaldehyde condensation product. Such dye-resist agents have been applied to the fibers comprising the article as a coating from a spin finish, or the substrate in the form of a yarn or woven, knitted, or tufted fabric has been treated in a process wherein the stain-resist composition is applied via immersion, padding, spraying, or other application means in either a batch or continuous process. Such processes are useful for the production of woven, knitted, or tufted polyamide substrates which resist staining by various acid-dye colorants such as those often present in food-stuffs. Because the aforementioned processes involve treatment of the fiber surface, these materials suffer from the disadvantage that the stain-resistance tends to deteriorate with wear. Such processes also are not effective in the manufacture of cut-pile carpets in which the pile comprises hollow-filament or cellular polyamide yarns, because the surface treatment does not sufficiently protect the interior voids of the filament and tip-staining occurs as the solution is taken up by the filament voids via capillary action.

It is known from Flamand U.S. Pat. No. 3,542,743, Crampsey U.S. Pat. No. 3,640,942, and Ucci U.S. Pat. No. 4,579,762 that polyamide materials may be rendered resistant to staining by acid dyestuffs by copolymerizing the nylon with cationic dye modifiers such as aromatic sulfonates. While the acid-stain resistance of these materials is greatly improved versus unmodified polyamides in products that are dyed to medium and deep shades, lighter shade or undyed products are visibly and permanently stained when left in contact with a solution containing typical acid dyes used as colorants for foodstuffs, e.g. FD&C Red Dye No. 40, for a period of several hours.

Thomm et al., U.S. Pat. No. 3,846,507, disclose fiber-forming polyamides having improved basic dye affinity and reduced acid dye affinity which polyamides contain benzene sulfonate units and which polyamide is blended with a normal polyamide, such as nylon 6.

Japanese Patent Application Publication 1-223908, published Sept. 7, 1989, discloses stain-resistant polyamides based on nylon 6, nylon 6.6, nylon 4, nylon 7, nylon 11, nylon 6, 10, etc., which contain a sulfonate-containing aromatic compound of the general formula

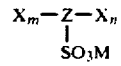

where X is any of COOH, RCOOH, COOR', RCOOR', and $RNH_2$ (R is a $C_{1-5}$ alkylene group; R' is a $C_{1-5}$ alkyl group;) Z is an aromatic group; m and n are 1 or 2; M is hydrogen, an alkali metal or an ammonium group. Preferably the sulfonate group content is in the range 0.1–5.0 mole % of the polyamide constituting units, with a terminal amino group content being not more than 10 eq./T.

SUMMARY OF THE INVENTION

The present invention relates to fiber-forming polyamide compositions comprising a first nylon polymer which is nylon 6, nylon 6,6 or nylon 6,6/6 copolymers prepared by copolymerizing the nylon polymer with a cationic dye modifier which is a sulfonated benzene dicarboxylic acid, or its salts or esters, which first nylon polymer is melt-blended with a polyamide containing 8 to 22 carbon atoms per amide link to form a block copolymer composition which is resistant to staining with acid dyes under ambient conditions, but which is readily dyed with acid dyes using a dyebath at pH 2–7 and a temperature of 60° to 100° C.

DETAILED DESCRIPTION OF THE INVENTION

It has been found that the stain resistance of certain polyamides which have been modified by salt-blending the polyamide precursor with a cationic dye modifier, such as 5-sulfoisophthalic acid or salts or other derivatives thereof, may be improved by melt-blending the modified polyamide with a high-carbon nylon. The salt-blended polyamides contain 0.5–4 wt%, and preferably 1–2 wt%, of the cationic dye modifier. This salt-blended, modified polyamide is melt-blended with about 1–15 wt%, based on the weight of the final, melt-blended polymer, of the high carbon nylon to form the stain-resistant compositions of this invention.

The term high-carbon nylon is used to specify aliphatic polyamides which have been formed from reactants containing from 8 to 22 carbon atoms per amide link. Some high-carbon nylons useful in this invention include nylon 6, 10, 6, 12, nylon 11, and nylon 12 and nylon 12/12. The melt-blended additives reduce the dye rate of the salt-blended nylon via formation of a block copolymer. This is in contrast to the copolymers described in Flamand or Huffman U.S. Pat. Nos. 3,039,990 and 3,142,6,62, where various diamines and diacids or aminoacids (including reactants used in the preparation of the aforementioned high-carbon nylons) are reacted in a salt-blend process to yield random copolymers which generally exhibit increased dye rate versus block copolymers of similar composition, and hence an increased propensity for staining. The final properties of the polymers of the current invention will be a function of melt temperature, residence time at the melt, and the chemical nature of the original polymers. As the residence time at the melt increases, transamidation reactions will tend to randomize the copolymer structure and increase the acid-dye rate, thus decreasing the degree of resistance to staining by acid dyestuffs. In the manufacture of stain-resistant fibers from the polymers of the current invention, effective melt-blending can be achieved by introducing the high-carbon nylon additive to the salt-blended copolymer near the entrance of a twin screw extruder.

The polyamide/cationic dye modifier copolymers useful in the present invention are prepared by salt blending the base polyamide precursor with a cationic dye modifier followed by polymerization. The salt (base polyamide precursor) for 6,6 nylon is

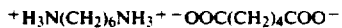

The salt (base polymer precursor) for nylon 6 is ε-caprolactam.

The cationic dye modifiers used to form the polymers useful in the present invention have the formula

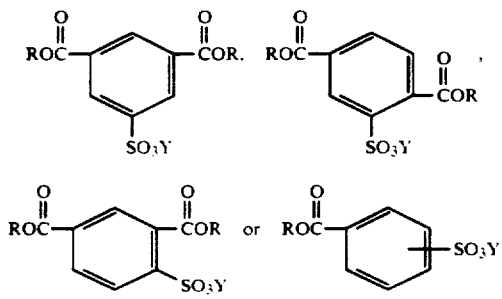

where Y is H, Li, Na, K or Cs and R is H or an alkyl group containing from 1 to 5 carbon atoms. The —OR groups are lost during polymerization. The preferred cationic dye modifiers are those having two carboxyl groups with 5-sulfoisophthalic acid being especially preferred. Sufficient quantities of the cationic dye modifer are salt-blended with the polyamide precursor to form, following polymerization, a polymer which contains from 0.5-4 wt%, and preferably from 1 to 2 wt% of the cationic dye modifier.

The cationic dye modifier-containing polyamides useful in the present invention can be prepared by blending the salts of the base polyamide with the cationic dye modifier followed by polymerizing the blended composition in an autoclave using standard polymerization procedures, solidifying and fragmenting the polymer, increasing the degree of polymerization by further polymerizing the polymer in the solid phase while super-drying the polymer, and further polymerizing the polymers in the molten state. The relative viscosity of the cationic dye modifier-containing polyamide should be from 35 to 100 when it is blended with the high carbon polyamide.

The first polyamide (cationic dye modifier-containing polyamide) is melt blended with a second polyamide containing from 8 to 22 carbon atoms per amide link in the polymer chain (high carbon polyamide). Generally the high carbon polyamide has a number average molecular weight of from 10,000 to 40,000 with from 14,000 to 27,000 being the preferred range. Generally, the melt blending is done in the extruder used to extrude the product fiber. As is known in the art, control of the moisture content of the polymer melt and the temperature thereof can be used to obtain the desired molecular weight of the product polyamide. Generally, the melt holdup time in the extruder transfer line and spin block should be from 4 to 12 minutes using a melt temperature of 270° to 300° C. Using shortened holdup times or lower temperature results in the product being a blend rather than a block copolymer, whereas the use of longer holdup times or higher temperatures can result in the product being an essentially random copolymer. Neither the blend nor the random copolymers exhibits the resistance to staining of the block copolymer compositions of the present invention.

Generally, from 1 to 15 wt% of the high carbon nylon, as based on the cationic dye modifier containing polymer, is used with from 3 to 12 wt% being the preferred range. Nylon 6, 12 and nylon 12 are the preferred high carbon nylons.

The polymers of the current invention have greater stain-resistance than the cationically modified polyamides described in the prior art referenced above, as will be demonstrated in the examples below. Since the polymers of the current invention are inherently stain resistant due to chemical modification of the polymer chains by salt-blending the polymer precursor salt with a cationic dye modifier prior to polymerization and subsequently melt-blending the resulting copolymer with a high-carbon nylon additive, fibers comprised of these polymers are stain-resistant throughout their entire cross-section, thus overcoming the disadvantages of substrates comprised of the coated fibers mentioned above. Fibers formed from these modified polyamides may be tufted into carpets or conventionally woven or knitted into fabrics. The fibers (as well as carpets, fabrics or other goods prepared therefrom) may be dyed by cationic dyes or disperse dyes using standard conditions well-known in the art, and are acid-dyeable at low pH (2-7) and elevated temperature (60°-100° C.).

The polymer compositions of this invention may also be injection-molded using known methods to form other types of shaped articles which have stain-resistant properties. Examples of such products are injection-molded tables and chairs or any other type of nylon product where resistance to food or other acid dye stains would be desirable.

Stain Test Method

The following test procedure was used to determine the stain-resistance performance of textile and carpet samples.

A solution of staining agent is prepared by dissolving 45 grams of cherry-flavored, sugar-sweetened "Kool-Aid" premix powder in 500 cc of water, and it is allowed to reach room temperature, i.e. 75° F. (±5°) or 24° C. (±3°), before using.

A specimen, approximately 1.5 in ×3 in (3.8×7.6 cm) for carpet samples and approximately 2 in ×4 in (5.1×10.2 cm) for flattened knitted textile tubes, is cut from each sample and placed on a flat, non-absorbant surface and 20 cc (10 cc for textile samples) of the staining agent is poured onto each specimen through a cylinder to form a 1 to 2 inch (2.5 to 5.1 cm) circular stain. The cylinder is removed and the solution is worked into the fabric or carpet to achieve uniform staining. The samples are then lagged in the laboratory for twenty-four hours and then rinsed thoroughly with cool tap water and squeezed dry, using an extractor to remove excess solution.

The stain resistance of the specimen is determined visually according to the amount of color left on the stained area of the fabric. This is referred to as the stain rating, and is herein determined for samples that are dyed to a very light beige color according to the Stain Rating Scale (a copy of which is currently used by and available from the Flooring Systems Division of E. I. du Pont de Nemours and Company, Wilmington, Del. 19898). These colors can be categorized according to the following standards:
5 = no staining
4 = slight staining
3 = moderate staining
2 = considerable staining
1 = heavy staining.
Carpets and fabrics that were dyed to deeper color shades were rated similarly on a scale of 1 to 5.

A stain-rating of 5 is excellent, showing good stain-resistance, whereas 1 is a poor rating, showing persistence of heavy staining. For a substrate to be considered to have adequate stain-resistance, it should have a rating of at least 4 on the above-described Stain Rating Scale.

EXAMPLES 1-4

Textile yarn samples were produced by preparing a copolymer from a salt-blend of nylon 6,6 salt and the sodium salt of the dimethyl ester of 5-sulfoisophthalic acid. The copolymer so-formed contained about 98 wt% nylon 6,6 and about 2 wt% of the cationic dye-modifier as determined by sulfur analysis.

The copolymer had a relative viscosity of 33.5 as produced and was dried in an oven for 16 hours at 105° C. under a vacuum of about $10kN/m^2$. The relative viscosity for this and the other examples herein is determined by measuring the flow time in seconds using a standard viscometer of a solution of 0.5 g of the polymer in 100 ml of hexafluoroisopropanol at 25° C. ($\pm 10°$ C.) and dividing by the flow time in seconds for the pure solvent.

The salt-blended copolymer was then melt-blended with a high-carbon nylon additive, in the amount reported in TABLE I below, at the entrance of a twin screw extruder (Model 402, manufactured by Werner-Pfleiderer Corp., 663 East Crescent Ave., Ramsey, N.J. 07446). Nylon 11 polymer, manufacturer's code BESHVO, was purchased from Atochem Polymers (Birdsboro, Pa.). The nylon 6, 12 polymer used is sold under the trademark ZYTEL-158 by E. I. du Pont de Nemours and Company. The blended flake was extruder-melted with the temperature increasing as the polymer progressed through the extruder from 235° to 277° C. The temperature was then held constant at approximately 279° C. as the polymer passed through the transfer line, spin-pump, block and spin pack. The residence time in line from the point of addition of the high-carbon nylon additive to the spinneret was approximately 10.5 minutes. The polymer was spun at 1.9 g/min/capillary into 17 filaments having a round cross-section. The filaments were air quenched and passed over a primary finish roll to a feed roll operating at a surface speed of 300 m/min. The spun filaments were drawn at ambient temperature to 19 denier per filament (21 dtex) by rolls operating at a speed of 900 m/min and then wound onto a tube at a speed of 860 m/min. A control sample was spun from the nylon 6,6/2% cationic dye modifier-containing polymer with no high-carbon nylon additive (Control A). The 320 denier yarns were knitted into circular tubes, a portion of which for Dyeing #1 were individually scoured by boiling for 20 minutes in an aqueous bath containing 1 g/l of sodium perborate, 0.25 g/l Jell IgeponTM T-51 (anionic surfactant used as a scouring agent for removing finish oils, produced by GAF Chemical Company, 1361 Alps Road, Wayne, N.J. 07470), rinsed 5 times and dyed in dye baths containing 0.2% based on weight of fabric of Telon Blue 2GL (200%) Acid Blue, C.I. No 40, at a liquor ratio of 40:1 in a simulated laboratory beck process. The dye bath containing the fabric was heated over a period of one hour to the boil and held at the boil for one hour. The solution pH for Dyeing #1 was maintained at 7 during dyeing. If necessary, at the end of the one hour boil, the pH was further reduced to about pH 2.0 to completely exhaust the dye, producing a very deep blue shade in all of the samples. Samples of the same fabrics were dyed to a light beige in Dyeing #2 in a simulated laboratory beck dyeing process using 0.007% dye (0.004% Tactilon Yellow 4R (250%) Acid Yellow C./I. No. 219, 0.002% Tactilon Red 2BV Acid Red (200%) C.I. No. 361, 0.001% Nylanthrene Blue Bar (200%)) based on the weight of fabric and a liquor ratio of 30:1. The samples were first wet-out in a room temperature bath at a pH of 8 for 15 minutes. The dyebath was adjusted to a pH of 7, the fabric placed in the bath, and heated to boil over a period of one hour followed by boiling for 1 hour with stirring. If necessary, at the end of the one hour boil, the pH was further reduced to about pH 2.0 to completely exhaust the dye. The above-mentioned high pH scouring step used in Dyeing #1 was found to degrade the stain-resistant performance of light-dyed samples and there-fore was not used in Dyeing #2. Dyed and undyed tubular samples were tested for stain-resistant according to the stain-test procedure described above. Results are summarized in TABLE I.

TABLE I

| EXAMPLE NO. | ADDITIVE TYPE | WT % ADDITIVE | UNDYED | STAIN RATING DYED DYEING #1 (DEEP BLUE) | DYED DYEING #2 (LT.BEIGE) |
| --- | --- | --- | --- | --- | --- |
| 1 | NYLON 6,12 | 6 | 5 | 5 | 5 |
| 2 | NYLON 6,12 | 1 | 4 | 5 | 3.5 |
| 3 | NYLON 11 | 10 | 4 | 5 | 3 |
| 4 | NYLON 11 | 1 | 3 | 5 | 3 |
| CONTROL A | NONE | — | 2 | 5 | 3 |

EXAMPLE 5

Carpet yarn samples were prepared by combining a salt-blend copolymer of nylon 6,6 and of the sodium salt of the dimethyl ester of 5-sulfoisophthalic acid with 9.8 wt% nylon 12 in a flake blend at the entrance of a twin screw extruder. The copolymer, prior to melt-blending, contained about 98 wt% nylon 6,6 and about 2 wt% of the cationic dye-modifier as determined by sulfur analysis.

The copolymer had a relative viscosity of 36 as produced and was dried in an oven for 16 hours at 105° C. under a vacuum of about $10kN/m^2$. The nylon 12, manufacturers' code AMNO, was purchased from Atochem Polymers (Birdsboro, Pa.).

The flake blend was melted in the extruder with temperature increasing as the polymer progressed through the extruder to a maximum of 290° C. The blend was further mixed with Kenics type static mixers in the transfer line to the spinnerets. The residence time from the point of addition of nylon 12 to the point at which the melt-blended polymer reached the spinneret was approximately 10.5 min. The polymer was spun into 128 4-void hollow filaments at 385 g/min. The filaments were then air quenched and passed over a primary finish roll to a feed roll operating at a surface speed of 581 m/min. The spun filaments were drawn by hot rolls at a temperature of 200° C. and a speed of 1657 m/min to yield a yarn of 1225 denier (1347.5 dtex). The drawn filaments were jet bulked with hot air at 105 psig (825 KPa) and 220° C. onto a bulking drum screen having a drum surface speed of 72 m/min where they were relaxed prior to being removed by a take-up roll at 1391 m/min. The bulked yarn was then wound onto tubes at a speed of 1479 m/min.

Yarns of Control sample B were spun using the same conditions from the salt-blend copolymer with no high-carbon nylon additive.

Both the test and the control yarns were separately twisted 4.5×4.5 turns per inch and Suessen heatset at a temperature of 205° C. prior to tufting into 1/10 inch gauge (39.37 tufts/dm), 3/8 in (9.53 mm) pile height, 38 oz/yd$^2$ (1288.3 g/m$^2$) cut-pile carpets. In addition a second sample of the bulked unheatset yarns (test and control) were direct tufted into loop pile-carpet samples of 1/10 inch gauge (39.37 tufts/dm), 1/4 in (6.35 mm) pile height, having a weight of 14.5 oz/yd$^2$ (491.6 g/m$^2$). A portion of each carpet sample was pot-dyed in a dyebath containing 0.1% on weight of fiber of Anthraquinone Milling Blue B (100%) Acid Blue (C.I. No. 122). The dye liquor was adjusted to a pH of 4.5, heated to 90° C., and the carpet immersed in the hot dye bath for 10 minutes while maintaining the temperature at 90° C. The carpet sample was washed to remove excess dye and dried in an oven at 125° C. The dyed and undyed carpet samples were tested for stain resistance according to the Stain Test procedure described above. Results are summarized in TABLE II.

TABLE II

| EXAMPLE NO. | ADDITIVE TYPE | WT % ADDITIVE | TWISTSET CONDITIONS | STAIN RATING UNDYED | DYED |
|---|---|---|---|---|---|
| 5 | NYLON 12 | 9.8 | SUESSEN | 5 | 5 |
| 5 | NYLON 12 | 9.8 | NONE | 4 | 5 |
| CONTROL B | — | — | SUESSEN | 2 | 5 |
| CONTROL B | — | — | NONE | 3 | 5 |

I claim:

1. A polymeric composition comprising a block copolymer containing blocks derived from (a) a first polyamide selected from the group consisting of polyhexamethylene adipamide, poly-ε-caprolactam, and a copolymer of hexamethylene adipamide and ε-caprolactam, said first polyamide having from 0.5 to 4 weight percent of a cationic dye modifier which has a sulfonic group and one or two carboxyl groups attached to a benzene nucleus and (b) from 1 to 15 weight percent, based on the total polymer weight, of a high carbon polyamide containing from 8 to 22 carbon atoms per amide link, said polymeric composition having high resistance to staining by acid dyes under ambient conditions.

2. The polymeric composition of claim 1 wherein the high carbon polyamide is polyhexamethylene decamide, polyhexamethylene dodecamide, poly-ω-undecalactam, poly-ω-dodecalactam or polydodecamethylene dodecamide.

3. The composition of claim 2 wherein the cationic dye modifier has the formula

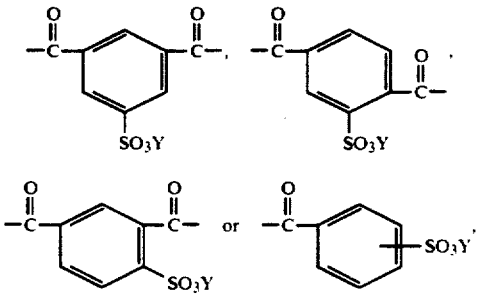

where Y is H, Li, Na, K or Cs.

4. The composition of claim 3 wherein from 1 to 2 weight percent of the cationic dye modifier is present as based on the weight of the first polyamide.

5. The composition of claim 4 wherein the cationic dye modifier has the formula

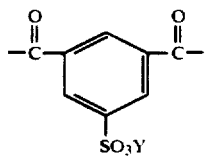

6. The composition of claim 5 wherein the cationic dye modifier-containing polymer is based on polyhexamethylene adipamide.

7. The composition of claim 6 wherein the high carbon polyamide is polyhexamethylene dodecamide.

8. The composition of claim 6 wherein the high carbon polyamide is poly-ω-undecalactam.

9. A fiber made from the composition of claim 1.

10. A shaped article injection-molded from the composition of claim 1.

* * * * *